United States Patent

Cory et al.

[15] 3,670,702
[45] June 20, 1972

[54] HINGE MECHANISM FOR A COVER PLATE IN AN ANIMAL FEEDER

[72] Inventors: Victor W. Cory; Edgar E. Williams; Robert J. Howard, all of Quincy, Ill.

[73] Assignee: Moorman Manufacturing Company, Quincy, Ill.

[22] Filed: July 29, 1970

[21] Appl. No.: 59,120

[52] U.S. Cl. .................................................. 119/52 R
[51] Int. Cl. .................................................. A01k 5/00
[58] Field of Search ................ 119/52 R, 53, 53.5, 54, 61

[56] References Cited

UNITED STATES PATENTS

| | | | |
|---|---|---|---|
| 3,124,105 | 3/1964 | Stapleton | 119/52 R X |
| 3,013,529 | 12/1961 | Parker et al. | 119/53 |
| 2,608,179 | 8/1952 | Otto | 119/52 R |
| 2,661,720 | 12/1953 | Rysdon et al. | 119/53 |
| 3,139,861 | 7/1964 | Oliver et al. | 119/53 |

*Primary Examiner*—Hugh R. Chamblee
*Attorney*—Greist, Lockwood, Greenawalt & Dewey

[57] ABSTRACT

The hinge mechanism includes pin formations on the cover plate and C-shaped straps which are secured to the animal feeder about the periphery thereof and which each receive the pin formations of adjacent cover plates. Each cover plate normally rests over a feeding portal in a feed trough which extends about the animal feeder. The cross section of each of the pin formations is substantially less than the opening defined between each of the C-shaped straps and the feeder to provide a sloppy fit and permit both pivotal and translational movement of the cover plate by an animal in the act of feeding so that the cover plate will be fully supported about the periphery of its associated portal when it is not disturbed by an animal and so that the cover plate will bear against an upwardly and outwardly inclined side wall portion of the animal feeder in generally flush relationship to a line of contact on the sidewall portion when the cover plate is forced against the side wall portion by an animal in the act of feeding.

6 Claims, 4 Drawing Figures

PATENTED JUN 20 1972 3,670,702
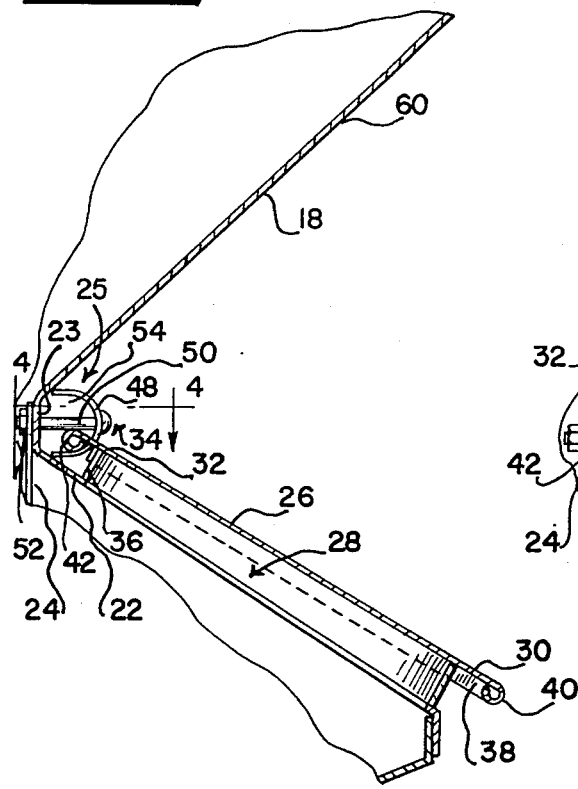
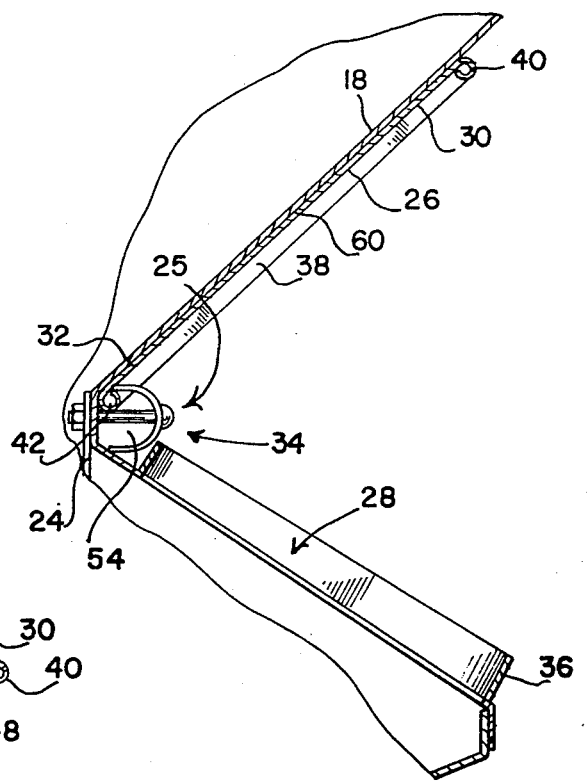
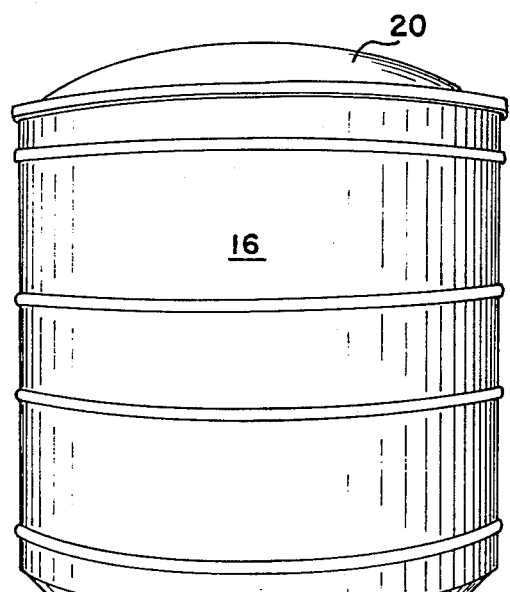
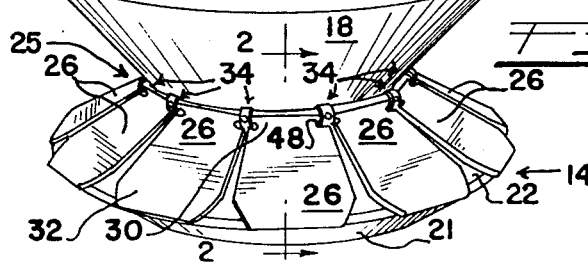
INVENTORS
VICTOR W. CORY
ROBERT J. HOWARD
EDGAR E. WILLIAMS
BY
ATT'YS

HINGE MECHANISM FOR A COVER PLATE IN AN ANIMAL FEEDER The present invention relates to an improved hinge mechanism for attaching a cover plate to an animal feeder in which the cover plate covers a feeding portal in a feed trough of the animal feeder. More particularly the present invention relates to a hinge mechanism for attaching the cover plate to the animal feeder in a manner which permits translational as well as pivotal movement of the cover plate when it is moved by an animal in the act of feeding.

A conventional animal feeder, such as a hog feeder, includes a generally upright feed supply bin and a feed trough which is located at the bottom of the feed supply bin and which extends about a major portion of the periphery of the supply bin. The feed trough is provided with a plurality of feeding portals and each portal is covered by a cover plate which is hingedly attached to the feeder. These cover plates are periodically and frequently opened and closed by animals during each day. Moreover, since each cover plate is hingedly attached to the feeder for pivotal movement about a fixed pivot axis, the contact point between the cover plate and the periphery of the portal is near the outer or free end of the cover plate. As a result of the contact point being near the outer end of the cover plate, the shock on the cover plate, when it is allowed to fall to its rest position over the portal, is concentrated in a small area near the outer end of the cover plate. This results in fatigue of the metal in this small area and cracks will develop at the outer corners of the cover plate and migrate toward the center of the cover plate. Eventually the entire outer end of the cover plate will break off.

When an animal forces open the cover plate to obtain feed from the feed trough the cover plate is pivoted upwardly about the fixed pivot axis. Since the pivot axis is fixed, the outer end of the cover plate engages a side wall portion of the feeder in a very small area. Moreover, an animal exerts considerable pressure against the cover plate while eating by pushing the back of its neck against the center of the cover plate and on both side margins of the cover plate. This pressure aggravates the "fatiguing" from the shocks imposed upon the outer end of the cover plate when it falls to its at rest position over its associated feeding portal. Additionally, the pressure on the center of the cover plate results in stresses being placed upon the cover plate at its hinged end resulting in fatigue at the hinged corners of the cover plate. This fatigue at the hinged corners of the cover plate eventually results in cracks in the cover plate followed by eventual breaking off of the cover plate from its hinged connection to the feeder.

The hinge mechanism of the present invention reduces the stresses placed upon the cover plates by attaching each cover plate to the feeder in a manner which permits translational as well as pivotal movement of the cover plate. In this way, the pivot axis of the cover plate is not fixed and the hinged end of the cover plate is not restricted to a fixed position. This manner of mounting or attaching the cover plate to the feeder alleviates much of the stresses which were previously imparted to the cover plate by the animal and by the closing shocks imposed on the cover plate when it is released by an animal.

When an animal allows a cover plate which is attached to the feeder in accordance with the teachings of the present invention to fall to its closed or at rest position over the portal, the weight of the cover plate causes the hinged end thereof to seek its lowest level before the cover plate has completely closed. In this way, when the cover plate finally closes, its contact point with the periphery of the portal is distributed about a peripheral or marginal area of the cover plate where it contacts the periphery of the portal resulting in a distribution of the shock imparted to the outer end of the cover plate and a reduction of the fatigue which otherwise would be developed in the outer end of the cover plate.

Additionally, when an animal forces the cover plate upwardly to gain access to the feeding portal, the forces exerted on the cover plate by the animal causes the cover plate to seek solid backing. Consequently, irrespective of how the animal pushes the cover plate, it stays flat against a side wall portion of the feeder. In other words, it is always forced into flush relationship with the side wall portion of the feeder along a line of contact on the side wall portion. In this way, the side wall portion of the feeder, and not the cover plate, absorbs the stresses. As a result, the metal of the cover plate is subjected to less fatigue and the cover plate has a greater useful life.

A primary object, therefore, of the present invention is to provide a hinge mechanism for attaching a feeding portal cover plate to an animal feeder in such a way that the forces imposed on the cover plate when it is manipulated by an animal in the act of feeding, are distributed about the cover plate and not concentrated in a small area on the cover plate.

Another object of the present invention is to provide a hinge mechanism for attaching a feeding portal cover plate to an animal feeder in such a way that the shock imparted to the cover plate, when it is released by an animal and is allowed to fall to its at rest position over a feeding portal in the feeder, will be distributed about a peripheral or marginal area of the cover plate.

Another object of the present invention is to provide a hinge mechanism for attaching a feeding portal cover plate to an animal feeder in such a way that when an animal forces the cover plate upwardly to gain access to the feeding portal, the forces exerted on the cover plate by the animal will be distributed along a line of contact of the cover plate with a side wall portion of the feeder.

Another object of the present invention is to provide a hinge mechanism for attaching a feeding portal cover plate to an animal feeder in such a way as will permit translational as well as pivotal movement of the cover plate between a covering position over a feeding portal in the animal feeder and an open position against a side wall portion of the feeder.

Still another object of the present invention is to provide a hinge mechanism for attaching a feeding portal cover plate to an animal feeder and in which the hinge mechanism includes straps secured to the feeder at spaced apart locations about the periphery of the feeder and pin formations at one end, and extending from opposite sides, of each cover plate, the pin formations being received in openings defined between the straps and the feeder, and the openings being substantially larger than the cross section of each of the pin formations such that the pivot axis of the cover plate is not fixed and translational as well as pivotal movement of the cover plate is permitted.

These and other objects and advantages of the present invention, including the manner of their attainment, will become more apparent from the following detailed description of a preferred embodiment of the invention taken in conjunction with the accompanying drawings wherein:

FIG. 1 is an elevational view of an animal feeder incorporating the hinge mechanism of the present invention;

FIG. 2 is a sectional view taken along line 2—2 of FIG. 1 and showing a cover plate disposed over a feeding portal of the animal feeder;

FIG. 3 is a vertical sectional view similar to FIG. 2, but with the cover plate raised; and, FIG. 4 is a sectional view taken along line 4—4 of FIG. 2 and showing a sectional view of the hinge mechanism of the present invention.

Referring now to the drawings in greater detail, an animal feeder is generally indicated at 10 in FIG. 1. The animal feeder 10 includes a generally upright supply bin 12 and an annular feed trough 14 which is situated at the bottom of the supply bin 12 and which extends around the supply bin 12. In the illustrated embodiment, the feed supply bin 12 is generally cylindrical having a cylindrical side wall portion 16 and a funnel portion which extends from the lower end of the cylindrical side wall portion 16. The funnel portion is formed by a lower frusto-conical sidewall portion 18 of the feeder 10. The upper end of the cylindrical side wall portion 16 is closed or covered by a dome shaped cover 20.

The feed trough 14 includes a generally flat base portion, which is hidden from view in FIG. 1, a frusto-conical upwardly inclined bottom wall portion 21 and a frusto-conical upper wall portion 22. The upper wall portion 22 has an annular upper edge 23 which is joined at the lower edge of the lower side wall portion 18 to an interior cylindrical wall portion 24 of the feeder 10, as best shown in FIG. 2 and 3. As shown, the annular edge 23 forms the bottom of a vertex 25 defined between the lower frusto-conical side wall portion 18 and the frusto-conical upper wall portion 22.

The frusto-conical upper wall portion 22 has a plurality of identical feeding portals therein which are hidden from view in FIG. 1 beneath individual and identical cover plates 26 therefor. One of the feeding portals is indicated generally at 28 in FIGS. 2 and 3.

Each cover plate 26 is generally rectangular, being shaped somewhat like a flower petal, and has an outer or free end 30 and an inner or hinged end 32. The hinge mechanisms for attaching or mounting the hinged ends 32 to the feeder 12 are generally indicated at 34.

Since all of the cover plates 26 are identical and are mounted to the feeder 12 in the same way only one cover plate 26 and its mounting to the feeder 12 will be described in detail with reference to FIGS. 2, 3 and 4. As best shown in FIGS. 2 and 3, the periphery of the portal 28 is defined by an upwardly extending rim or lip 36 which extends from the frusto-conical upper wall portion 22 of the feed trough 14. The cover plate 26 is normally supported in its lower or at rest position on the upstanding lip 36 and, in this way, the weight of the cover plate 26 is distributed about the lip 36 when the cover plate 26 is in an at rest position as shown in FIG. 2.

The cover plate 26 includes a downwardly extending skirt 38 on each side thereof and the skirts 38 are so dimensioned that each skirt 38 is spaced outwardly a slight distance from the lip 36 on each side of the portal 28 when the cover plate is in the at rest position. The outer end 30 of the cover plate 26 has a downwardly extending rolled flange 40 under which an animal will place his snout to lift the cover plate 26 and raise it to its fully raised position shown in FIG. 3. By having the rolled flange 40 at the outer end of the cover plate 26 a smooth surface is provided under which an animal can place his snout without injury when the animal desires to obtain feed from the feed trough 14 through the portal 23.

The inner end 32 of the cover plate 26 also has a downwardly extending rolled flange as indicated at 42. As best shown in FIG. 4, the ends of the rolled flange 42 define opposite hand pin formations 44 and 46 on either side of the cover plate 26 at the inner end 32 thereof. Each pin formation 44 or 46 forms part of one of the hinge mechanisms 34.

In addition to the pin formations 44 and 46 each hinge mechanism includes a generally C-shaped or U-shaped strap 48. The straps 48 are situated at spaced apart locations about the periphery of the feeder 10 and are secured at the vertex 25 between the lower side wall portion 18 of the feed supply bin 12 and the upper wall portion 22 of the feed trough 14 by suitable fastening means which, in the illustrated embodiment, includes a bolt 50 and a nut 52 for each strap 48.

As best shown in FIGS. 2, 3 and 4, the cross-section of each of the pin formations 44 and 46 is substantially less than the opening 54 defined between each strap 48 and the feeder 10. In this way, each strap 48 loosely holds or retains the pin formation 44 and 46 of adjoining cover plates 26 so that the cover plates 26 are attached to the feeder 10 in a manner permitting translational as well as pivotal movement of each cover plate 26. In this respect, the pivot axis for each cover plate 26 is not fixed, but instead, is allowed to take a number of positions within the two openings 54 formed by the two straps 48 holding the cover plate 26 to the feeder 10.

To permit the pin formations 44 and 46 to move freely within the two openings 54, the cover plate 26 is provided with notches 56 and 58 on opposite sides of the cover plate 26. The notches 56 and 58 extend longitudinally of the cover plate 26 inwardly from each pin formation 44 and 46 a sufficient distance so that the cover plate 26, with the pin formation 46 and 48 positioned in the two openings 54, can be freely moved laterally toward and away from the straps 48.

With the hinge mechanism 34 constructed in the manner described, an animal, such as a hog, can easily move the cover plate 26 upwardly against the lower side wall portion 18 and, in view of the several degrees of freedom of movement of the cover plate 26 allowed by the hinge mechanism 34, the cover plate 26 will always be moved by the hog into generally flush relationship with the lower side wall portion 18 of the supply bin 16 along a line 60 of contact on the side wall portion 18 in such a way that the cover plate 26 bears tangentially against the side wall portion 18 along the line 60 of contact, as best shown in FIG. 3. Thus, the brute force exerted by the hog as he forces the back of his neck against the cover plate 26 will be distributed along the line 60 of contact of the cover plate 26 with the side wall portion 18 and little, if any stress is placed upon the free end 30, or hinged end 32 of the cover plate 26.

Moreover, when the cover plate 26 is released by the hog, the entire cover plate 26 will fall in such a way that the rolled flange 42 falls to the position shown in FIG. 2 while the remainder of the cover plate 34 begins to pivot downwardly. After the rolled flange 42 at the inner end 32 of the cover plate engages the strap 48, the cover plate 26 will fall in such a way that the shock of the weight of the cover plate falling on the lip 36 is distributed along the lip 36 about the periphery of the portal 28. In this way, the shock imposed upon the cover plate 26, when it falls to the at rest position shown in FIG. 2, is not concentrated in a small area near the outer end 30, but instead, is distributed along the length of the cover plate 26 in a marginal area of the cover plate 26 extending about the periphery of the portal 28.

Although in the illustrated embodiment, the strap 48 is generally C-shaped, it is to be understood that the strap 48 can take other forms. For example, it may be a linear strap which extends vertically across the vertex 25 formed between the upper wall portion 22 of the feed trough 14 and the lower side wall portion 18 of the feed supply bin 12. As another alternative, the strap 48 can be V-shaped and secured to the feeder by welds.

Additionally the pin formations 44 and 46 and the strap 48 can be dimensioned and located in such a way that the cover plate 26 can be removed from its retained position without the use of any special tools merely by the proper twisting and manipulation of the cover plate 26. Thus, in the event a cover plate 26 is damaged or broken, it can be easily replaced by unskilled labor without the need for special tools merely by twisting and then withdrawing the cover plate 26 from the feeder 10.

From the foregoing description, it will be understood that the present invention has a number of characteristics and advantages, some of which have been described and others of which are inherent in the invention. Therefore, the scope of the invention is only to be limited as necessitated by the accompanying claims.

What is claimed is:

1. In an animal feeder including a generally upright feed supply bin and feed trough means extending about at least a major portion of said bin and adjacent the bottom of said bin for supplying feed to animals, said trough means having at least one feeding portal which is normally covered by an individual cover plate resting thereover and said supply bin having an upwardly and outwardly inclined side wall portion, the improvement comprising hinge means for loosely attaching said cover plate to said feeder in a manner which permits both free pivotal and translational movement of said plate by an animal in the act of feeding whereby said cover plate will be fully supported about the periphery of said portal thereby distributing the weight of said cover plate around said periphery when it is not raised by an animal and whereby said cover plate will bear against said side wall portion of said feeder in generally flush non-binding relationship to a line of contact on said side wall portion when said cover plate is forced against said side wall portion by an animal in the act of feeding thereby distributing the bearing force on said cover plate along said line of contact on said wall portion.

2. An animal feeder as defined in claim 1 wherein said cover plate includes at least two pin formations located at one end of said cover plate and extending laterally from opposite sides, respectively, of said cover plate and said hinge means includes a pintle means for receiving each of said pin formations, said pintle means being secured to said feeder at spaced apart locations about said feed trough means and each of said pintle means having a pin receiving opening substantially larger than the cross section of each pin formation to allow translational as well as pivotal movement of each pin formation received within said opening in each pintle means.

3. An animal feeder as defined in claim 2 wherein said cover plate is rolled at one end to form said pin formations.

4. An animal feeder as defined in claim 2 wherein each of said pintle means includes a strap secured to said feeder at spaced apart locations about said feed trough means, said opening defined between each strap and said feeder being substantially greater than the cross section of each pin formation.

5. An animal feeder as defined in claim 2 wherein said cover plate is rolled at one end to form said pin formations, said hinge means includes a generally C-shaped strap for each pin formation, said straps being secured to said feeder at spaced apart locations, said opening defined between each of said C-shaped straps and said feeder being substantially greater than the cross section of each of said pin formations received within each of said openings, and said cover plate has a notch in each side thereof adjacent each of said pin formations and extending from said pin formation a distance sufficient to permit said pin formations to move freely within said openings defined within said C-shaped straps inwardly of said straps so that said cover plate will always fall to an at-rest position over said portal when said cover plate is released by an animal.

6. An animal feeder including a generally upright supply bin having a lower funnel shaped portion defined by a lower frusto-conical side wall portion, annular feed trough means extending about said bin at the bottom thereof for supplying feed to animals, said trough means having a frusto-conical upper wall portion with individual feeding portals therein, the upper edge of said frusto-conical upper wall portion being joined to the lower edge of said lower frusto-conical side wall portion, an individual cover plate for each portal, each of said portals having an upwardly extending peripheral lip upon which its associated cover plate rests, each cover plate being rolled at one end to form laterally extending pin formations at said one end, and hinge means including C-shaped straps secured to said feeder at spaced apart locations around said feed trough means at the vertex formed by the junction between said lower frusto-conical side wall portion and said frusto-conical upper wall portion, each opening defined between each strap and said feeder being substantially greater than the cross section of each of said pin formations to allow free translational as well as free pivotal movement of said pin formations in said openings whereby each cover plate will normally rest on said lip of one of said portals and whereby, when each of said cover plates is moved by an animal in the act of feeding, said cover plate will bear tangentially against said frusto-conical side wall portion along a line of contact on said frusto-conical side wall portion.

* * * * *